United States Patent [19]

Matsen

[11] Patent Number: 4,622,445
[45] Date of Patent: Nov. 11, 1986

[54] METHOD OF INDUCTIVELY BRAZING HONEYCOMB PANELS

[75] Inventor: Marc R. Matsen, Seattle, Wash.

[73] Assignee: The Boeing Company, Seattle, Wash.

[21] Appl. No.: 655,540

[22] Filed: Sep. 28, 1984

[51] Int. Cl.[4] .............................................. H05B 6/10
[52] U.S. Cl. .............................. 219/10.41; 219/10.57; 219/85 A; 219/10.73; 228/181
[58] Field of Search .................. 219/10.41, 10.43, 9.5, 219/10.49 R, 10.57, 10.73, 85 A, 85 R, 78.11, 78.12, 101.6 R; 228/181; 156/272.2, 273.7, 273.9, 274.2

[56] References Cited

U.S. PATENT DOCUMENTS

| | | | |
|---|---|---|---|
| 2,372,929 | 4/1945 | Blessing | 219/10.53 X |
| 2,777,929 | 1/1957 | Brennan | 219/9.5 |
| 2,984,732 | 5/1961 | Herbert, Jr. | 219/85 R X |
| 3,016,450 | 1/1962 | Keeleric | 219/78.12 |
| 3,053,969 | 9/1962 | Kerr et al. | 219/78.12 X |
| 3,520,053 | 7/1970 | Hinton et al. | 219/9.5 X |
| 4,333,598 | 6/1982 | Ittner et al. | 228/181 |

FOREIGN PATENT DOCUMENTS

| | | | |
|---|---|---|---|
| 141475 | 5/1980 | German Democratic Rep. | 219/85 A |
| 46-9928 | 3/1971 | Japan | 219/85 A |

Primary Examiner—Philip H. Leung
Attorney, Agent, or Firm—Finnegan, Henderson, Farabow, Garrett & Dunner

[57] ABSTRACT

A process for brazing a metal face sheet to a honeycomb core to form a composite member. A brazing alloy is placed between the face sheet and the core. Rigid thermal insulation is used to press the face sheet against the core while heating the structure with induction heating for a time just sufficient to melt the brazing alloy. The portion being brazed is covered by an inert gas when it is at elevated temperatures. The rapid heating and cooling of the brazing alloy by induction heating joins the face sheet to the core without excessive energy consumption or the need for a complex vacuum system.

8 Claims, 4 Drawing Figures

METHOD OF INDUCTIVELY BRAZING HONEYCOMB PANELS

BACKGROUND OF THE INVENTION

1. Field of the Invention

The present invention relates to the fastening of face sheets to honeycomb cores by means of brazing.

2. Description of the Prior Art

The strength to weight requirements of many advanced structures require the use of faced honeycomb panels. While such panels may be formed by means of nonmetallic materials, for certain applications, metal faced honeycombs with metal cores are desirable. Several conventional methods are used to bond the face sheets to the core.

Furnace brazing is a technique where the entire honeycomb panel, with the face sheets abutted thereto, is placed within a furnace. The face sheets are affixed to the core by melting and then solidifying the brazing alloys at the interface. The size of the structure being brazed determines the furnace size and in some applications very large furnaces, with the attendant high equipment costs and difficulties with respect to the maintenance of a proper gaseous atmosphere around the structure during the brazing process, are required. In many applications the brazing process requires a vacuum environment with the attendant cost of large pumps, complex sealing systems and the like. Typically, such equipment requires very large power input. In addition, the thermal cycling times for such large furnaces present the potential for significant problems with respect to the braze alloy attacking the base metal of either the face sheet or the honeycomb core during the long thermal cycling times necessary for proper operation of such equipment.

Some attempt has been made to use infrared heating to braze metal faced honeycomb panels. Very large power requirements are associated with the use of such equipment and proper thermal cycling requires extensive instrumentation and monitoring. In addition, as with the use of a furnace brazing techniques, the control of the vacuum or gaseous atmosphere surrounding the structure is difficult and expensive.

A third means of heating a metal honeycomb structure to braze the face sheets to the core consists of salt bath brazing where the structure is immersed in a molten salt bath. While such a process is feasible, with a number of alloys it is difficult to find salt compositions that do not react with the materials at brazing temperatures. Cleaning of the structures subsequent to such processes is difficult, but necessary to avoid subsequent corrosion problems.

It is the principal object of the present invention to provide a means for forming metal faced honeycomb structures that economically heats the brazed joint with minimal energy consumption. Another object is to minimize the time the panel is exposed to elevate temperatures that may induce detrimental microstructural changes. It is also an object of the invention to eliminate the need for complex vacuum systems that are many times necessary with prior art methods. By using induction heating in the manner set out below, the power requirements for forming such materials are lower without the attendant difficulties in treating large sized panels. Furthermore, the complexity of atmosphere controls is significantly reduced and corrosion problems due to salt residue are non-existent. These objects and other advantages of the invention will be more clearly apparent from the description which follows or may be learned by practice of the invention.

SUMMARY OF THE INVENTION

In order to achieve the objects and advantages set out above, there is provided a process for brazing face sheets to a honeycomb core panel. The process involves the steps of first placing a brazing alloy between the face sheet and the core. Next, a heat resistant rigid thermal insulating sheet is placed on the face sheet and the face sheet is then pressed against the brazing alloy and the honeycomb core. The portion of the panel to be brazed is covered by an inert gas. Heat is applied to the brazing alloy in an amount sufficient to increase the temperature above its melting point by induction heating. The brazing alloy is then cooled to a temperature below its melting point thereby brazing the face sheets to the honeycomb core.

In a preferred process for forming honeycomb panels of relatively large size, the brazing alloy is placed between the face sheet and the core and then a heat resistant thermal insulating sheet is placed on a portion of the face sheet. The face sheet is pressed against the brazing alloy and the honeycomb core. Inert gas is then applied to the portion to be brazed. Heat is applied to the portion of the brazing alloy beneath the insulating sheet by activating an induction heater. The heat is sufficient to increase the temperature of the brazing alloy above its melting point. The induction heater is then deactivated and the molten brazing alloy is allowed to solidify. The pressure applied by the insulating sheet is then released and the core and the facing sheet are advanced such that an unbrazed portion is beneath the insulating sheet. The process is repeated until a desired amount of the face sheet is brazed to the honeycomb core.

The embodiment of the invention carrying out the process of the present invention is depicted in the following figures which constitute a portion of this specification.

DESCRIPTION OF THE PREFERRED EMBODIMENT

The present invention is a process for brazing the face sheets onto a honeycomb core to form metal honeycomb panels. Such panels find utility in a number of applications where their exceptional strength to weight ratios provide the physical properties necessary to meet the requirements of the structure. While the brazing of such face sheets to honeycomb cores is conventionally done in a number of ways set out above, the present process has a number of advantages, as will be outlined below.

Figure 1:
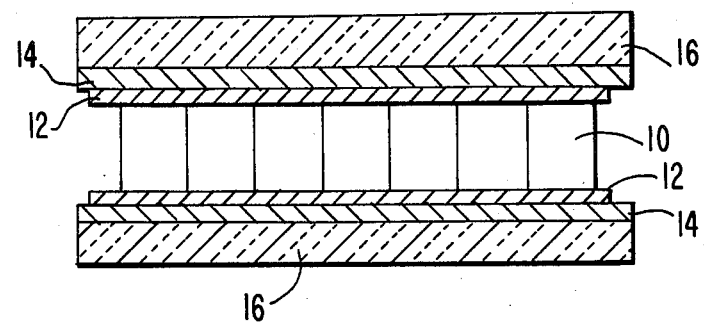
FIG. 1 is a cross-sectional view of a honeycomb structure being formed by means of the present invention.

In accordance with the invention, a brazing alloy is placed between the face sheets and the core. This step of the present invention may be done in a number of conventional ways, which include placing metal brazing alloy foils between the sheet and the core, adhering a powder brazing alloy to either of the components or in some way placing the alloy in the proper location so that it will form the joint between the honeycomb core and the face sheet. As depicted in FIG. 1, the core 10 is placed between two metal face sheets 14 with an intermediate foil layer 12 of a brazing alloy.

The brazing alloy should, of course, be compatible with the material comprising the face sheet and the core. Because the present invention reduces the time that the brazing alloy is molten, it may utilize brazing alloys that are not feasible with conventional techniques that involve long thermal cycles at high temperature. In the present invention, diffusion of species from the brazing alloy into either the face or the core that could degrade its properties is reduced because of the short time the brazing alloy is molten. Even when conventional techniques involve only momentary melting, the thermal cycling of the structure, because of its size and atmosphere requirements, may also involve long times at a temperature near the melting point where significant diffusion of undesirable species from the brazing alloy to the face sheet or core may occur. By minimizing the time at which the structure is at an elevated temperature, the present invention reduces such detrimental effects.

In accordance with the invention, a heat resistant rigid thermal insulating member is placed on the face sheet. As here embodied and depicted in FIGS. 1-3, the insulating members 16 are placed on the face sheets 14 and with the core 10 therebetween.

Figure 2:
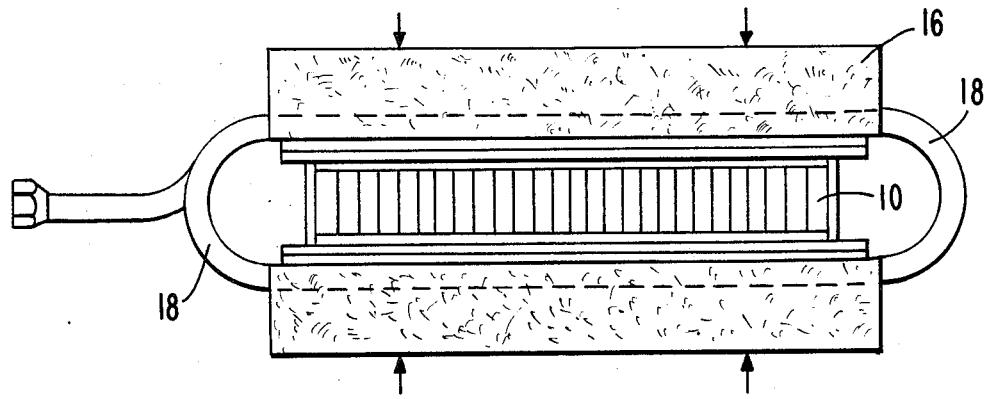
FIG. 2 is a partial cross-sectional view of an apparatus carrying out the present invention.
Figure 3:
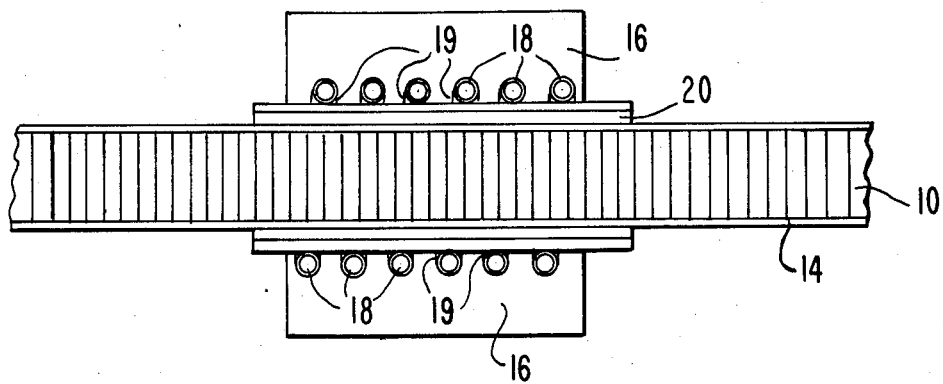
FIG. 3 is a side view of the embodiment of FIG. 2.

As depicted in the FIGS. 2 and 3, the insulating members may have copper coils 18 embedded in slots 19 which form the inductor for induction heating apparatus. The insulating sheets are ceramic fiber insulation, such as KAOWOOL. The sheets thermally insulate the portion of the honeycomb structure being heated, as well as partially shield the surface of the face sheet from the surrounding atmosphere. While the composition of the thermal insulation is not known to be critical, it should not contain metal in an amount that would induce heating of the thermal insulation and it must have sufficient strength to apply pressure to the face sheet.

In accordance with the invention, the process includes pressing the face sheet against the brazing alloy and the honeycomb core. As here embodied and depicted in FIG. 2, the pressure is applied through the insulating sheet which also contains the inductors for the induction heating means. Any number of means for applying pressure to the insulating sheet may be used and one of ordinary skill in the art to which the invention pertains needs no specific teaching in order to devise an effective manner of pressing the face sheet against the brazing alloy and the honeycomb core.

In accordance with the invention, the portion of the panel to be brazed is covered by an inert gas. Because the surface of the panel is covered by the insulating sheet and the time at elevated temperature is relatively short, oxidation can be prevented or reduced by simple enclosures that surround a portion of the panel and cover that portion with inert gas.

In accordance with the invention, heat is applied to the brazing alloy in an amount sufficient to increase its temperature above the melting point by induction heating. The time and temperature of heating the brazing alloy is determined by its melting point and the compositions and mass of the facing sheet and the honeycomb core. Some experimentation may be necessary in order to determine the time temperature heating cycle for each individual system; however, one skilled in the art to which the invention pertains would not find such experimentation excessive or unusual.

In accordance with the invention, the brazing alloy is then allowed to cool to a temperature below its melting point thereby fastening the face sheet to the core. In a preferred embodiment, after deactivation of the induction heater and the cooling and solidification of the brazing alloy, the pressure applied to the insulating sheet is released and the core and facing sheet are advanced such that an unbrazed portion of the panel is beneath the insulating sheet. The insulating sheet then applies pressure to the facing sheet and the process is repeated.

Figure 4:
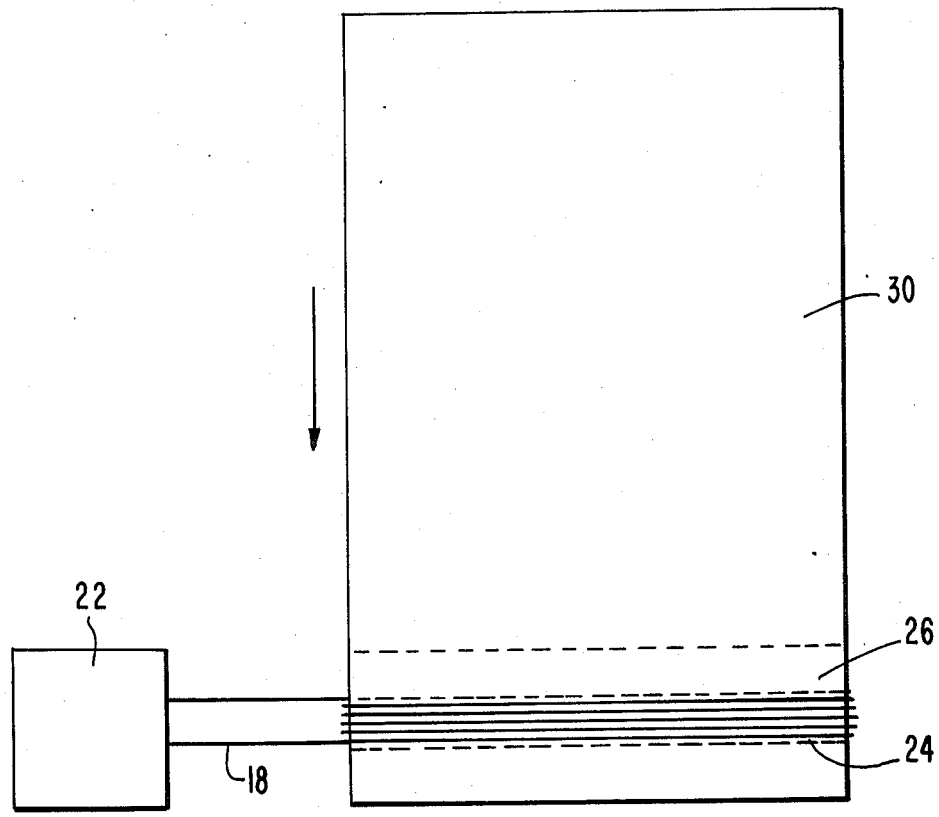
FIG. 4 is a schematic top plan view of an embodiment for brazing large honeycomb panels in accordance with the present invention.

A schematic representation of such a system is depicted in FIG. 4. In the embodiment depicted, a panel 30 is constructed into a metal faced honeycomb by advancing it sequentially beneath a pair of inductors (only one of which is shown). The upper inductor 18 would actually be within slots in an insulating member and compression means would engage the insulating member. In such an embodiment, the area 24 of the panel 30 would be subjected to heating from the upper inductor 18 over the area 24 while the lower inductor (not shown) would heat an equivalent area on the opposite side of the panel 30. That portion of the panel would also be covered with an inert gas. After the area 24 was brazed, the induction unit 22 would be coordinated with the advance of the panel 30 such that area 26 would then be brazed. In such a way the entire panel 30 would have the face sheets brazed to the core. In such a manner, a large structure may be formed by brazing a number of areas individually to form a very large structure with no one portion of the structure being at a temperature that may be detrimental to the materials therein for any length of time. In addition, extremely large panels may be brazed, with the equipment necessary to braze such large panels being relatively small. By repetitive induction brazing of portions of such large panels with a relatively small inexpensive apparatus, the entire structure can be brazed without the necessity for a large furnace, excessively high energy consumption, and a complex protective atmosphere or vacuum furnace.

The present invention was used in connection with the following example:

Inconel 625 face sheets 0.0045 inches thick were brazed to an Inconel 625 honeycomb core having a ⅜th inch core size and 0.003 inch wall thickness. A brazing alloy of 1002× (metglas) was used in the form of a foil 0.0015 inches thick. An insulating sheet of 0.1 inch thick Kaowool was placed on each face sheet and a mechanical jig was used to apply pressure to the insulating material. The entire specimen was enclosed in an enclosure into which argon gas was introduced. An induction coil having a quarter-inch outside diameter was placed adjacent to the insulating sheets and activated to braze the face sheets to the core. The resulting structure showed excellent fillets of the braze alloy at the honeycomb/face sheet interface and good capillary flow of the braze alloy between the honeycomb cells. There was no apparent evidence of reaction between the braze alloy and the honeycomb material.

The present invention has been disclosed both in general terms and by means of a specific example. The invention however, is not limited to the embodiments described herein and is limited solely by the appended claims and their equivalents.

What is claimed is:

1. A process for brazing at least one face sheet to a honeycomb core panel, said process comprising the steps of:
   (a) placing a brazing alloy between said face sheet and said core;
   (b) placing a heat resistant, rigid, thermal insulating member on said face sheet;
   (c) pressing said face sheet against said brazing alloy and said honeycomb core panel;
   (d) covering the portion of the face sheet and core panel to be brazed with an inert gas;
   (e) applying heat to said alloy within said portion sufficient to increase the temperature of said alloy above its melting point by induction heating; and
   (f) cooling said brazing alloy to a temperature below its melting point.

2. The process of claim 1 wherein said brazing alloy is in the form of a foil.

3. The process of claim 1 wherein said brazing alloy is in the form of metal powder.

4. The process of claim 3 wherein said core panel has two opposite faces disposed to have face sheets adhered thereto, said process includes the step of adhering powdered brazing alloy to the faces of said core panel.

5. A process for brazing at least one face sheet to a honeycomb core panel, said process comprising the steps of:
   (a) placing a brazing alloy between said face sheet and said core panel;
   (b) placing a heat resistant, rigid, thermal insulating member on a portion of said face sheet;
   (c) pressing said face sheet against said brazing alloy and said core panel with pressure from said insulating member;
   (d) covering said portion of said face sheet and said core panel to be brazed with an inert gas;
   (e) applying heat to a portion of said brazing alloy beneath said insulating member by activating an induction heater, said heat being sufficient to increase the temperature of said alloy above its melting point;
   (f) deactivating said induction heater and allowing molten brazing alloy to solidify;
   (g) releasing pressure applied by said insulating sheet;
   (h) advancing said core panel and said face sheet such that an unbrazed portion is beneath said insulating member; and
   (i) repeating steps (c)–(g) until the desired amount of face sheet is brazed to said honeycomb core.

6. The process of claim 5 wherein said brazing alloy is in the form of a foil.

7. The process of claim 5 wherein said brazing alloy is in the form of metal powder.

8. The process of claim 7 wherein said core panel has two opposite faces disposed to have face sheets adhered thereto, said process includes the step of adhering powdered brazing alloy to the faces of said core panel.

* * * * *